G. E. LEWIS.
SCROLL-SAWING MACHINE.
No. 191,765.            Patented June 12, 1877.
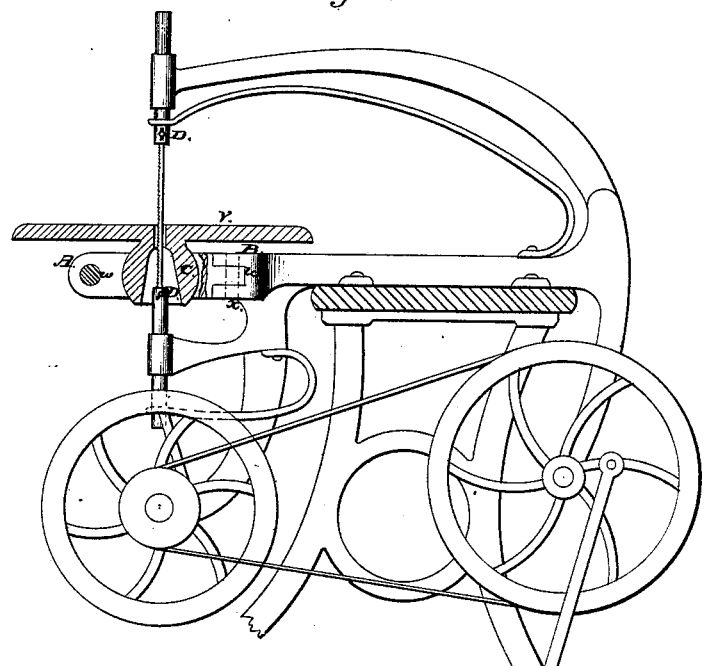
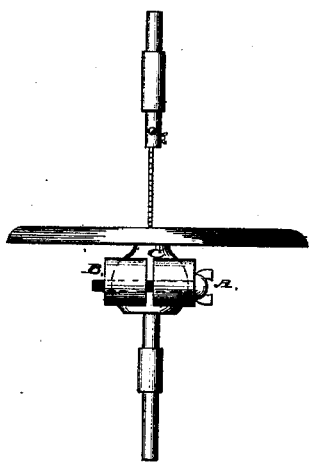
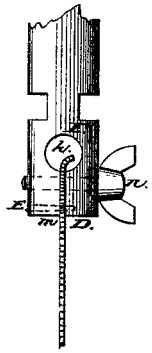
Attest:
Thomas Ellerby
LeRoy Lewis
Inventor.
George E. Lewis

UNITED STATES PATENT OFFICE.

GEORGE E. LEWIS, OF SENECA FALLS, NEW YORK.

IMPROVEMENT IN SCROLL-SAWING MACHINES.

Specification forming part of Letters Patent No. 191,765, dated June 12, 1877; application filed April 6, 1877.

*To all whom it may concern:*

Be it known that I, GEORGE E. LEWIS, of Seneca Falls, in the county of Seneca and State of New York, have invented a new and useful Improvement in Scroll-Sawing Machines, of which the following is a specification.

The invention will first be fully described, and then pointed out in the claims.

Figure 1 is a sectional side elevation of the machine, showing the table with the hollow ball and hinged clamp ready for use. Fig. 2 is a view of the machine, showing the front of hollow ball and clamp. Fig. 3 is a sectional view of my improved saw-clamp.

V is the table of the machine, which, with the hollow ball $c$, is made in one piece, and is held in its place by the clamp A B, which is fitted to the hollow ball $c$, and, by unscrewing the screw $w$ in Figs. 1 and 2, then the table can be tipped to any angle and in any direction, and held to its place by again screwing up the screw $w$ in Figs. 1 and 2, the object of which is to saw on a bevel on either side of the saw. The clamp A B is made with a hinge, $u$, in Fig. 1, with the pin $x$ to hold the hinge in its proper place.

The saw-clamp is made of a piece of metal with a hole, F, and then slotted, as shown in the drawing, and provided with thumb-screw $n$ to tighten upon saw D when necessary; also, the pin E, which is to keep the saw D from slipping away from its work, and also as a guide for the proper place to put the saw D; and if the operator desires to change the saw D often he need tighten up the screw $n$ only enough to let the saw slip in easy; but, by bending saw at $h$, it will then remain in its place, as, the saw D being so bent, it thus forms a hook.

Having thus described my invention, I claim as new and desire to secure by Letters Patent—

1. The combination of the clamp A B, provided with the pin $x$, screw $w$, and hinge $u$, with the table V, having the hollow ball $c$, constructed as shown and described, for the purpose specified.

2. A saw-clamp, provided with the hole F and slot $m$, in combination with the pin E and screw $n$, constructed, as shown and described, for the purpose specified.

GEORGE E. LEWIS.

Attest:
 THOMAS ELLERBY,
 LE ROY LEWIS.